US010892115B2

(12) United States Patent
Adams et al.

(10) Patent No.: US 10,892,115 B2
(45) Date of Patent: Jan. 12, 2021

(54) LASER-CUT BUTTON VENEER FOR A CONTROL DEVICE HAVING A BACKLIT KEYPAD

(71) Applicant: Lutron Technology Company LLC, Coopersburg, PA (US)

(72) Inventors: Jason O. Adams, Emmaus, PA (US); Rich Destremps, Allentown, PA (US); George M. Drizos, Macungie, PA (US); Scott A. Kleppinger, Macungie, PA (US); Brad Michael Kreschollek, Bethlehem, PA (US); Matthew Philip McDonald, Phoenixville, PA (US); Shawn A. Strange, Blandon, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 16/362,677

(22) Filed: Mar. 24, 2019

(65) Prior Publication Data
US 2019/0221382 A1     Jul. 18, 2019

Related U.S. Application Data

(63) Continuation of application No. 15/242,205, filed on Aug. 19, 2016, now Pat. No. 10,276,322.

(Continued)

(51) Int. Cl.
*H01H 13/02* (2006.01)
*H01H 13/83* (2006.01)
(Continued)

(52) U.S. Cl.
CPC .......... *H01H 13/023* (2013.01); *B23K 26/38* (2013.01); *B32B 7/12* (2013.01); *B32B 15/082* (2013.01);
(Continued)

(58) Field of Classification Search
CPC ...... H01H 13/023; H01H 11/00; H01H 13/14; H01H 13/83; H01H 2229/02;
(Continued)

(56) References Cited

U.S. PATENT DOCUMENTS 1,464,515 A    8/1923  Thomas
1,761,868 A    6/1930  Burke
(Continued)

FOREIGN PATENT DOCUMENTS

EP    1808880 A1    7/2007

OTHER PUBLICATIONS

International Search Report, International Application No. PCT/US2016/047890, International Filing date Aug. 19, 2016, dated Jul. 11, 2016.

*Primary Examiner* — Edwin A. Leon
*Assistant Examiner* — Lheiren Mae A Caroc
(74) *Attorney, Agent, or Firm* — Condo Roccia Koptiw LLP (57) ABSTRACT

A veneer configured to be secured to a backlit button of a control device may include a plate portion. The plate portion may have one or more laser-cut indicia defined therethrough, may have laser-cut rounded corners, and may have angularly offset outer edges that may be defined during an embossing process. The laser-cut indicia may be representative of a command for controlling an electrical load. The indicia may include an alphanumeric character, an icon, or the like, may define one or more substantially zero-radius corners, and may define respective inner surfaces that are substantially perpendicular to an outer surface of the plate portion. A laser-cut alphanumeric character may have variable (e.g., continuously variable) line width. The plate portion may define a rib that suspends a floating portion of the alphanu- (Continued)

meric character relative to an open portion. The rib may define a thickness that does not exceed 0.003 inches.

20 Claims, 7 Drawing Sheets

Related U.S. Application Data (60) Provisional application No. 62/269,498, filed on Dec. 18, 2015, provisional application No. 62/207,767, filed on Aug. 20, 2015.

(51) Int. Cl.
| | |
|---|---|
| *B23K 26/38* | (2014.01) |
| *B32B 7/12* | (2006.01) |
| *B32B 15/082* | (2006.01) |
| *B41M 5/24* | (2006.01) |
| *H01H 11/00* | (2006.01) |
| *H01H 13/14* | (2006.01) |
| *H01H 9/18* | (2006.01) |

(52) U.S. Cl.
CPC .............. *B41M 5/24* (2013.01); *H01H 11/00* (2013.01); *H01H 13/14* (2013.01); *H01H 13/83* (2013.01); *B32B 2457/00* (2013.01); *H01H 2009/187* (2013.01); *H01H 2219/028* (2013.01); *H01H 2219/036* (2013.01); *H01H 2229/02* (2013.01); *H01H 2231/052* (2013.01)

(58) Field of Classification Search
CPC ....... H01H 2009/187; H01H 2219/036; H01H 2219/028; H01H 2231/052; B32B 7/12; B32B 15/082; B32B 2457/00; B23K 26/38; B41M 5/24
USPC .......................................................... 200/314
See application file for complete search history.

(56) References Cited

U.S. PATENT DOCUMENTS

| | | | |
|---|---|---|---|
| 1,977,261 A | 10/1934 | Brown | |
| 2,109,054 A | 2/1938 | Soreng et al. | |
| 4,131,777 A | 12/1978 | Bailey et al. | |
| 4,667,073 A | 5/1987 | Osika | |
| 5,036,440 A | 7/1991 | Takii et al. | |
| 5,120,920 A | 6/1992 | Moriike | |
| 5,456,955 A | 10/1995 | Muggli | |
| 5,911,317 A | 6/1999 | Tsai | |
| 6,180,048 B1 | 1/2001 | Katori | |
| 6,803,728 B2 | 10/2004 | Balasubramaniam et al. | |
| 7,119,296 B1 * | 10/2006 | Liu | H01H 13/704 200/341 |
| 7,134,205 B2 | 11/2006 | Bruennel | |
| 7,534,500 B2 | 5/2009 | Kobayashi et al. | |
| 8,870,477 B2 | 10/2014 | Merminod et al. | |
| 9,349,309 B1 | 5/2016 | Eloyan et al. | |
| 9,443,676 B2 | 9/2016 | Na | |
| 9,640,347 B2 | 5/2017 | Kwan et al. | |
| 9,763,302 B2 | 9/2017 | Mcdonald et al. | |
| 9,911,372 B2 | 3/2018 | Dimberg et al. | |
| 2010/0282580 A1 * | 11/2010 | Maatta | H01H 13/83 200/314 |
| 2011/0018161 A1 | 1/2011 | Yang | |
| 2012/0111704 A1 * | 5/2012 | Stohr | H01H 13/83 200/341 |
| 2014/0001977 A1 | 1/2014 | Zacharchuk et al. | |
| 2015/0083561 A1 * | 3/2015 | Han | H01H 13/83 200/314 |
| 2015/0090570 A1 | 4/2015 | Kwan et al. | |
| 2016/0069537 A1 | 3/2016 | Dimberg et al. | |
| 2016/0307714 A1 | 10/2016 | Bhate et al. | |
| 2017/0053753 A1 * | 2/2017 | Adams | B23K 26/38 |
| 2017/0347420 A1 | 11/2017 | McDonald et al. | |

\* cited by examiner

LASER-CUT BUTTON VENEER FOR A CONTROL DEVICE HAVING A BACKLIT KEYPAD

CROSS-REFERENCE TO RELATED APPLICATIONS

This application is a continuation of U.S. patent application Ser. No. 15/242,205, filed Aug. 19, 2016, which claims priority to U.S. provisional patent application No. 62/207,767, filed Aug. 20, 2015, and to U.S. provisional patent application No. 62/269,498, filed Dec. 18, 2015, both of which are incorporated herein by reference in their respective entireties.

BACKGROUND

Load control devices may be used to control the amount of power delivered from a power source, such as an alternating-current (AC) power source, to one or more electrical loads. An example of such a load control device is a wall-mounted dimmer switch. Load control devices may be integrated into home automation systems.

Home automation systems, which have become increasing popular, may be used by homeowners to integrate and/or control multiple electrical and/or electronic devices in their homes. For example, a homeowner may connect devices such as appliances, lights, blinds, thermostats, cable or satellite boxes, security systems, telecommunication systems, and the like to each other via a wireless network.

The homeowner may control such devices using a central (e.g., automated) controller, a dedicated remote control device (e.g., a wall-mounted keypad), a user interface provided via a phone, tablet, computer, or other device that is directly connected to a home network or remotely connected via the Internet, and so on. These devices may communicate with each other and/or with a control device, for example to improve efficiency, convenience, and/or usability of the devices.

Dedicated remote control devices, such as wall-mounted keypads, may be manufactured to be aesthetically pleasing. For example, wall-mounted keypads may include faceplates and buttons made of metal, glass, or other materials to lend the keypads a luxury aesthetic when compared to traditional plastic keypads. However, the manufacture of such keypads may be problematic. For instance, in the case of metallic buttons, indicia are typically formed in the buttons using machining processes. However, such machining processes have limitations. For instance, small scale machining processes may be incapable of very fine detail, which may lead to undesirable aesthetics in the indicia, and/or may introduce inaccuracies or inconsistencies into the manufacturing process that reduce yield. Additionally, such machining processes are typically time intensive, which may impact manufacturing costs and capacity.

SUMMARY

As described herein, a veneer may be configured to be secured to a backlit button of a control device, such as a wall-mounted keypad. The control device may be configured for use with a load control device, such as a dimmer switch.

The veneer may include a plate portion that has one or more laser-cut indicia defined therethrough. The plate portion may further include laser-cut rounded corners. The veneer may further include a filler material that is disposed in the one or more indicia.

The laser-cut indicia may be representative of a command for controlling an electrical load. The indicia may include an alphanumeric character, an icon, or the like. The indicia may define a substantially zero-radius corner. The indicia may define respective inner surfaces that are substantially perpendicular to an outer surface of the plate portion of the veneer.

At least a section of a laser-cut alphanumeric character may define a variable (e.g., continuously variable) line width. If the alphanumeric character includes a floating portion, such as the letter "o" for example, the plate portion of the veneer may define one or more ribs that suspend the floating portion relative to an open portion of the alphanumeric character. Each rib may define a thickness that does not exceed 0.003 inches, for instance such that the ribs are virtually invisible to the naked eye of a user of the control device.

An example method of producing a button that is configured for installation in a control device having a backlit keypad may include laser cutting one or more indicia into a veneer that is configured to be attached to an outer surface of the button. The indicia may be representative of a command for controlling an electrical load. The method may include adhering the veneer to the outer surface of the button.

Another example method of producing a button that is configured for installation in a control device having a backlit keypad may include embossing a metal blank with an array of button veneers. The method may include laser cutting one or more indicia into at least one of the button veneers. The indicia may be representative of a command for controlling an electrical load. The method may include disposing a filler material into the indicia. The method may include separating the veneers from the blank. For example, the method may include laser cutting slots along respective perimeters of the button veneers. The slots may enable separating the veneers from the blank. Laser cutting the slots may include rounding the corners of each of the veneers. The method may include securing each veneer to a corresponding button of the keypad.

DETAILED DESCRIPTION

Figure 1:
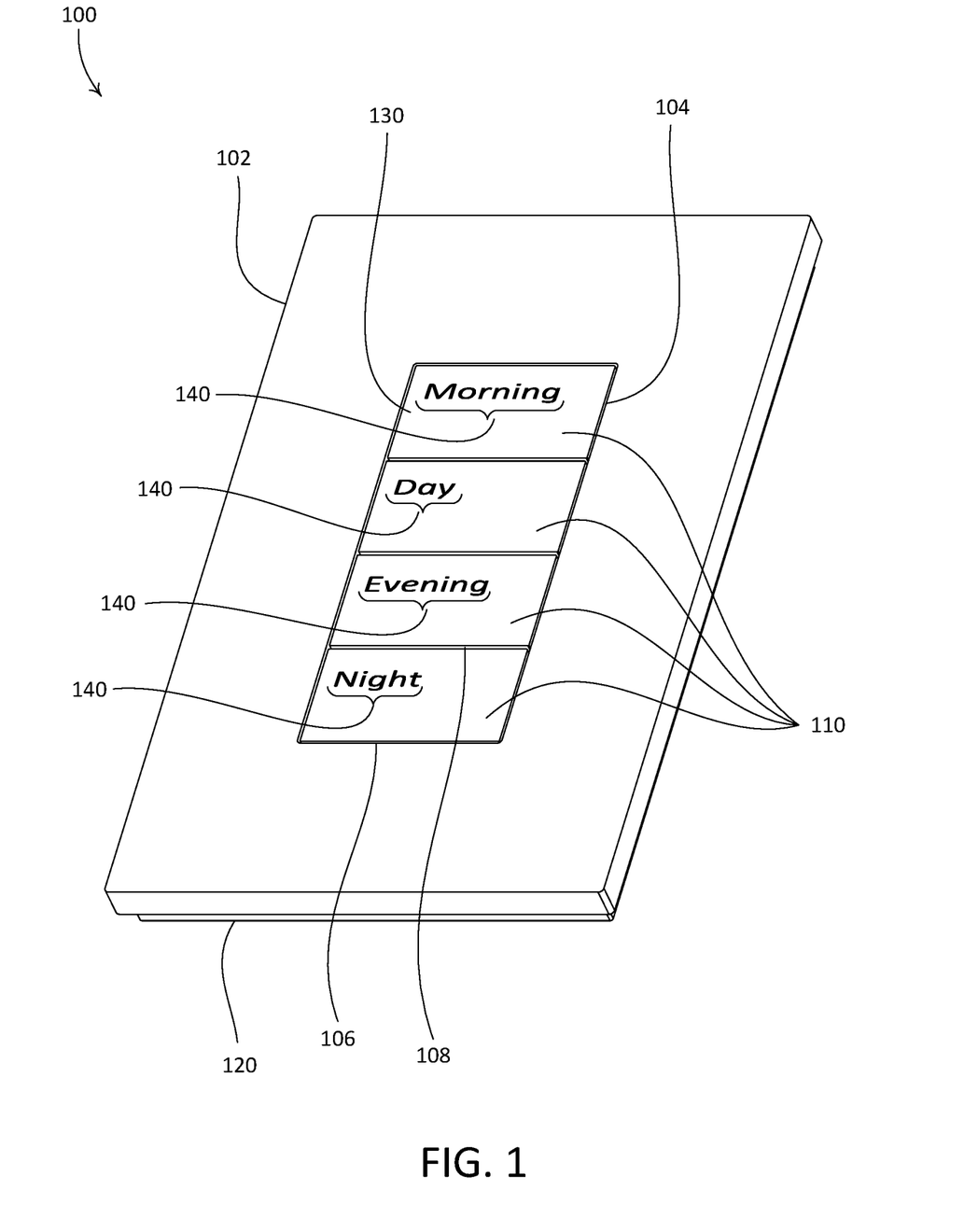
FIG. 1 is a perspective view of an example control device, configured as a wall-mounted keypad, for use in a load control system for controlling the amount of power delivered to one or more electrical loads.

FIG. 1 depicts an example control device that may be configured for use in a load control system for controlling one or more load control devices and/or electrical loads, such as lighting loads, motorized window treatments, or the like. As shown, the example control device is configured as a wall-mounted keypad 100. The keypad 100 may include a faceplate 102, one or more buttons 110, and a housing 120 that is configured to be mounted to a structure, such as an interior wall of a building. The illustrated keypad 100 may be configured to control a load control device, such as a load control device configured to control an amount of power delivered to one or more electrical loads (e.g., one or more lighting loads) from a power source, such as an alternating-current (AC) power source or a direct current (DC) power source.

The faceplate 102 may define an opening 104 that extends therethrough and that is configured to at least partially receive the buttons 110. For example, in accordance with the illustrated keypad 100, the opening 104 may be sized to receive the buttons 110 such that a gap 106 is defined between inner edges of the opening 104 and corresponding outer peripheral surfaces of the buttons 110. The keypad 100 may be configured such that the gap 106 remains uniform around the perimeter of the opening 104. The keypad 100 may further be configured such that facing edges of adjacent buttons 110 are spaced apart from each other by a gap 108 that is substantially the same as (e.g., equal to) the gap 106 between the buttons 110 and the opening 104 of the faceplate 102. The faceplate 102 may be made of the same material, or using the same mix of materials, as the buttons 110. Alternatively, the faceplate 102 and the buttons 110 may be made of different materials. In accordance with an example implementation, the buttons 110 may be made of plastic and may have metal veneers that are attached thereto, and the faceplate 102 may be made of the same metal as the button veneers. The faceplate 102 may be configured to be attached to (e.g., removably attached to) the housing 120.

The illustrated keypad 100 includes four buttons 110 that are rectangular in shape and are of the same size. However, it should be appreciated that the keypad 100 is not limited to buttons having the illustrated button geometries. For example, the keypad 100 may alternatively include more or fewer buttons having the same or different geometries and/or sizes. The buttons 110 may be made of a mix of materials. For example, each illustrated button 110 may include a button body that is made of a first material (e.g., plastic), and may include a veneer 130 that is made of a different material (e.g., metal) and that is attached to the button body of the button 110.

Each veneer 130 may have one or more indicia 140 formed therein, such as cut therethrough. The indicia 140 may be representative of a function that the keypad 100 is configured to execute or that the keypad is configured to cause to be executed. For example, the indicia 140 may be representative of a command for controlling an electrical load. In accordance with an example implementation of the keypad 100, the indicia 140 may be representative of a message that the keypad 100 is configured to transmit, for instance a message that includes a command for execution by a load control device that is associated with the keypad 100. In accordance with an alternative example implementation, the keypad 100 may include an integral load control circuit (e.g., a dimming circuit), and the command may cause the integral load control circuit to control an electrical load that is electrically connected thereto. The indicia 140 of a particular button 110 may include one or more visual representations of a function associated the button 110, such as, for example, one or more alphanumeric characters, icons, etc. in any combination.

In accordance with the buttons 110 of the illustrated keypad 100, the indicia 140 may be words that are indicative of respective functions that are invoked by depressing the buttons 110. The indicia 140 may be laser cut through the veneers 130 of the buttons 110, or may otherwise be formed on the buttons 110. The keypad 100 may include one or more lighting elements (not shown) that are configured to illuminate respective interiors of the buttons 110, such that the indicia 140 are backlit from within an interior of the keypad 100. For example, the keypad 100 may include a plurality of lighting elements, such as light emitting diodes (LEDs), that are disposed within the housing 120 of the keypad 100, behind the buttons 110, and that are configured to backlight the buttons 110. In this regard, the illustrated keypad 100 may be referred to as a backlit keypad or control device.

Examples of button indicia and button backlighting systems are described in greater detail in commonly-assigned U.S. Provisional Patent Application No. 62/048,652, titled "Control Device Having Buttons With Metallic Surfaces And Backlit Indicia," and U.S. Provisional Patent Application No. 62/048,658, titled "Control Device Having Buttons With Multiple-Level Backlighting," the entire disclosures of which are incorporated herein by reference.

The keypad 100 may be configured to transmit one or more digital messages to one or more external load control devices (e.g., dimmer switches) and/or electrical loads via a communication link, for example in response to one or more buttons 110 being depressed. The one or more digital messages may include, for example, one or more commands for execution by the one or more external load control devices to control respective electrical loads (e.g., lighting loads). The communication link may comprise a wired communication link or a wireless communication link, such as a radio-frequency (RF) communication link. In accordance with an alternative configuration, the keypad 100 may further include an internal load control circuit (not shown) for controlling the power delivered to one or more electrical loads (e.g., lighting loads). Examples of load control systems having remote control devices, such as the keypad 100, are described in greater detail in commonly-assigned U.S. Provisional Patent Application No. 62/150,227, titled "Control Devices Having Independently Suspended Buttons For Controlled Actuation," U.S. Pat. No. 6,803,728, issued Oct. 12, 2004, entitled "System For Control Of Devices," and U.S. Patent Application Publication No. 2014/0001977, published Jan. 2, 2014, entitled "Load Control System Having Independently-Controlled Units Responsive To A Broadcast Controller," the entire disclosures of which are incorporated herein by reference.

Figure 2:
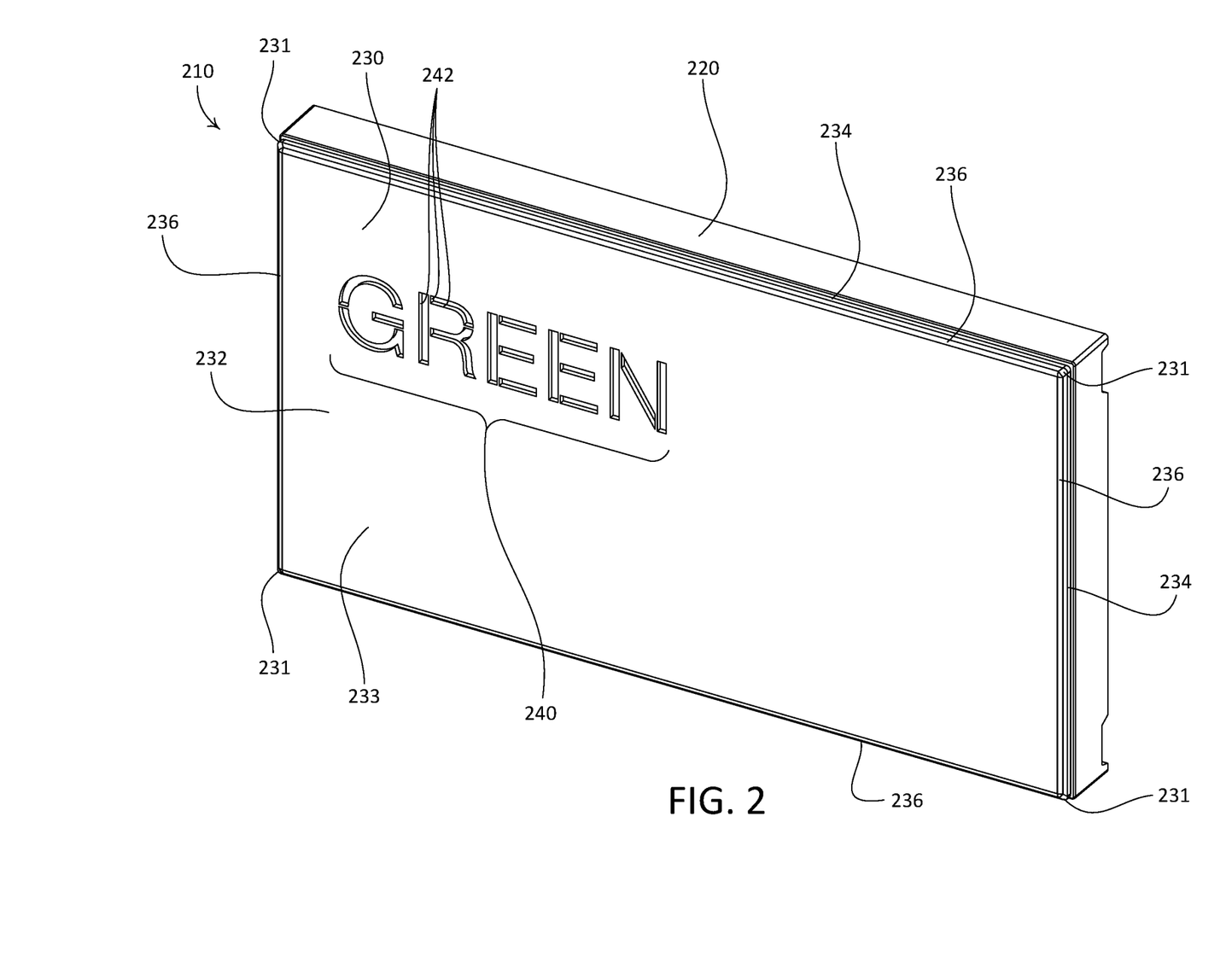
FIG. 2 is a perspective view of an example button that may be implemented in a control device, the button including a button body and a veneer with laser-cut indicia that is attached to the button body.

FIG. 2 depicts an example button 210 that may be a component of a control device. For example, the button 210 may be implemented as one or more of the buttons 110 of the keypad 100. As shown, the button 210 includes a button body 220 and a veneer 230 that is attached to a front surface of the button body 220. The button body 220 may be referred to as a as a carrier portion, such as a carrier portion of the button 210 or more generally as a carrier portion of a control device in which the button 210 is installed, such as the keypad 100.

The veneer 230 may include a plate portion 232 and may define peripheral walls 234 that extend rearward from the plate portion 232. The plate portion 232 may define a front surface 233 of the veneer 230. As shown, the plate portion 232 may define a flat, substantially planar front surface 233. The plate portion 232 and the peripheral walls 234 may define four corners 231 of the veneer 230. The veneer 230 may define outer edges 236 that extend along an outer perimeter of the plate portion 232, between the corners 231, along an interface between the plate portion 232 and the peripheral walls 234. As shown, the outer edges 236 of the veneer 230 may be angularly offset relative to the front surface 233. However, it should be appreciated that the veneer 230 is not limited to the illustrated outer edges 236. For example, the veneer 230 may be alternatively formed, with outer edges 236 that may be rounded, may be square, or may define other geometries relative to the front surface 233.

In an example implementation, the veneer 230 may be formed from a sheet of metal, for example by an embossing process, a progressive stamping process, or the like. The formation process of the veneer 230 may define, for example, one or more of the plate portion 232, the peripheral walls 234, and the outer edges 236. The corners 231 of the veneer 230 may be rounded, for example during a laser cutting process that separates the formed veneer 230 from a blank after the forming process is performed.

The button body 220 may be configured such that the plate portion 232 and the peripheral walls 234 of the veneer 230 at least partially enclose a front portion of the button body 220 when the veneer 230 is attached to the button body 220. The button body 220 may be made of any suitable material, such as plastic.

The veneer 230 may include one or more indicia, such as indicia 240 that are defined in the plate portion 232 of the veneer 230. For example, the indicia 240 may be formed during a laser cutting process. As shown, the indicia 240 extend into the front surface 233 of the veneer 230 and through the plate portion 232. The front surface 233 of the veneer 230 may alternatively be referred to as an outer surface of the veneer 230. The veneer 230 may be made of any suitable material, such as metal. The button body 220 may be made of a translucent material, for instance white or clear plastic, such that when the button body 220 is backlit, light may pass through the button body 220 and reach an inner surface of the veneer 230, for example an inner surface of the plate portion 232. Such light may be emitted, for example, from the interior of a control device in which the button 210 is installed, such as the keypad 100. In accordance with such an implementation, the indicia 240 of the veneer 230 may expose corresponding underlying surfaces of the button body 220, such that the indicia 240 may be illuminated when the button body 220 is backlit. In this regard, the veneer 230 may be configured to be secured to a backlit button of a control device.

The illustrated indicia 240 include letters that form a word. However, the indicia 240 are not limited to letters, and may include any combination of alphanumeric characters, icons (e.g., symbols), or the like. The indicia 240 may be representative of a command for controlling an electrical load. For example, the indicia 240 may be representative of: a command message that may be transmitted by a control device in which the button 210 is operatively installed; of a command that is executed internally by such a control device; of a result of the performance of a command; or the like. To illustrate, one or more command messages may be transmitted by such a control device in response to one or more actuations of the button 210. The veneer 230 may include a filler material (not shown) that is disposed into the indicia 240. The filler material may prevent the accumulation of debris (e.g., dirt, skin, or the like) in the indicia 240. The filler material may, for example, be backfilled into the indicia 240 such that the filler material is coplanar with the front surface 233 of the veneer 230. The filler material may further function to improve the optical performance of the indicia 240 when one or more of the buttons 210 are backlit, for instance to improve the readability of the indicia 240 when viewed from off angle.

Forming the indicia 240 of the veneer 230 via a laser cutting process may enable the indicia 240 to exhibit one or more characteristics that are not typically achievable in indicia defined via known processes of button veneer manufacture, such as machining. Examples of such characteristics are illustrated in FIGS. 2 and 3.

For example, as shown in FIG. 2, in accordance with a characteristic of laser-cut indicia 240, the indicia 240 have corresponding inner surfaces 242 that may be substantially perpendicular to the front surface 233 of the veneer 230, for example approximately 89°-91° from the front surface. This is in contrast to indicia formed by known techniques of machining into material having a planar surface, which indicia may exhibit tapered inner surfaces that are not perpendicular with respect to the planar surface. Perpendicular inner surfaces, such as inner surfaces 242, may enable more light to be emitted from the indicia 240, which may improve the aesthetic characteristics of the indicia 240, and thus of the button 210, for instance when the button 210 is backlit.

Figure 3:
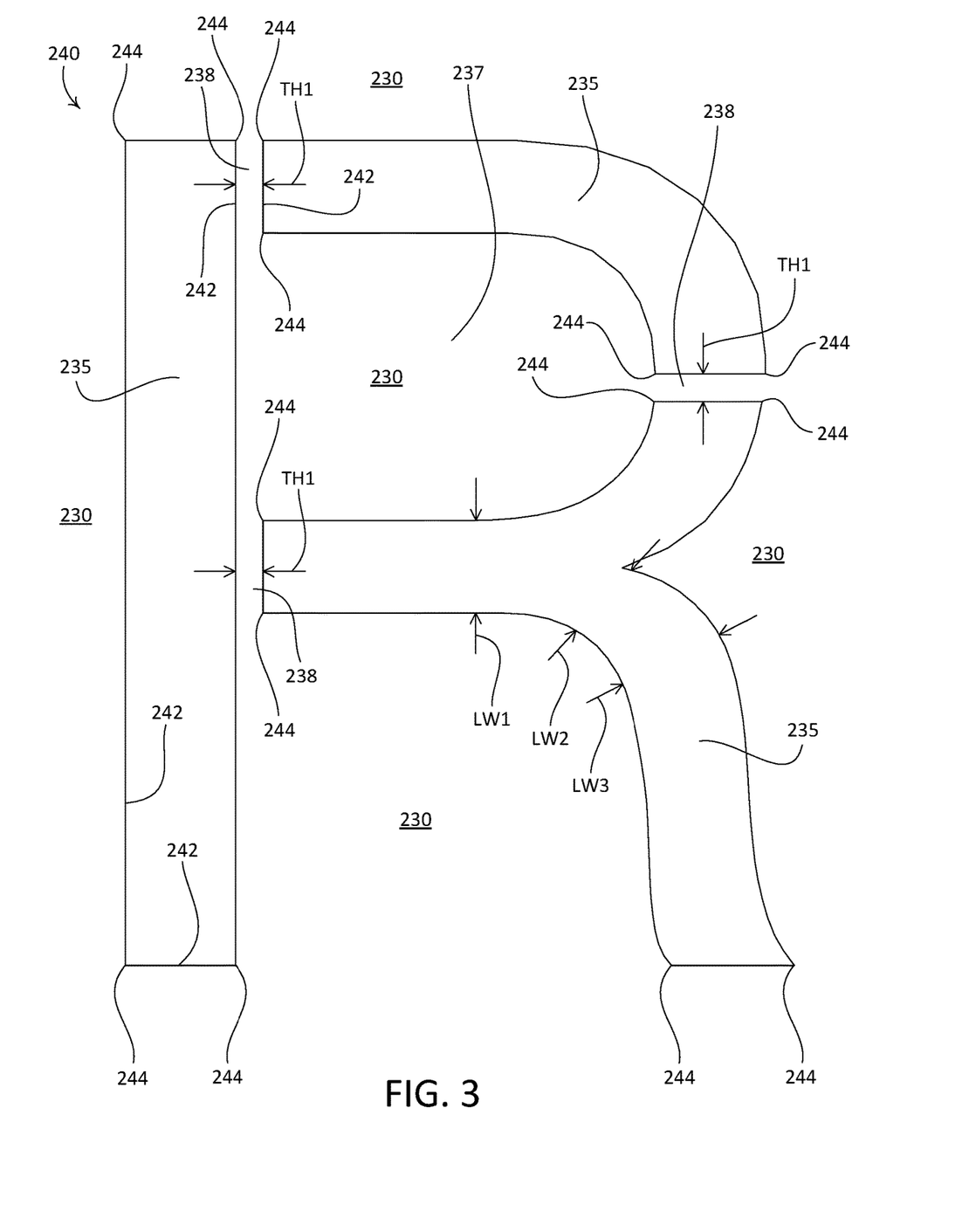
FIG. 3 depicts an example indicia that may be laser cut into a veneer secured to the button of a control device.

FIG. 3 depicts a portion of the example indicia 240, in particular the letter "R." As shown, the plate portion 232, once laser cut with the indicia 240, defines one or more open portions 235 that extend through the plate portion 232, and may define one or more floating portions 237, such as that defined by the hoop of the "R." The open portions 235 and floating portions 237 may be referred to as being defined by the corresponding indicia 240.

In accordance with another characteristic of laser-cut indicia 240, the indicia 240 may define one or more corners 244 that have very small minimum radii. For example, the corners 244 of the illustrated "R" of the indicia 240 may have a minimum radius of approximately 0.0004 inches or smaller. The corners 244 may be referred to as inside corners of the indicia 240. The corners 244 may appear, for instance to the naked eye of a user of a control device in which the button 210 is installed, as sharp corners having no radii at all. In this regard, the corners 244 of the illustrated indicia may be referred to as substantially zero-radius corners, or more generally as zero-radius corners. In contrast, the corners of indicia (e.g., alphanumeric characters) that may be formed using known machining techniques may have minimum radii of approximately 0.0035". The presence of substantially zero-radius corners, such as the corners 244 of the illustrated indicia 240, may enhance the aesthetic characteristics of the indicia 240, and thus of the button 210, for instance when the button 210 is backlit.

The plate portion 232 may further define one or more ribs 238 that suspend one or more corresponding floating portions 237 relative to one or more open portions 235. For example, in accordance with the illustrated "R," the plate portion 232 defines three ribs 238 that suspend the floating portion 237 relative to the three open portions 235. The ribs 238 within a portion of an indicia 240, for instance within a particular alphanumeric character, may be configured to enable the control of one or more aspects of the separation of one or more scrap pieces (not shown) from the plate portion 232 during the laser cutting process. The one or more scrap pieces may correspond, for example, to the open portions 235 of the indicia 240. Such aspects may include, for example, how one or more scrap pieces release from the plate portion 232 (e.g., twisting, bending, and the like) and/or when one or more scrap pieces release from plate portion 232 during the laser cutting process. One or both of the number of ribs 238 that are defined by an indicia 240 and the corresponding locations of the ribs 238 may influence the aspects of scrap piece separation. Control of the separation of scrap pieces from the plate portion 232 may assist with successful completion of the process of laser cutting the indicia 240. In this regard, an indicia 240 (e.g., a font) may be designed to enhance performance of laser cutting the indicia 240 into the plate portion 232 of a veneer 230.

In accordance with still another characteristic of laser-cut indicia 240, the laser-cutting process may be performed such that the ribs 238 are thinner than the thickness of ribs achievable with known machining processes. For example, the illustrated ribs 238 may be defined with a thickness TH1 that may be, for example, between 0.002 inches and 0.004 inches, such as about 0.003 inches. In this regard, the ribs 238 may define respective thicknesses that do not exceed 0.003 inches. At a thickness of approximately 0.003 inches or narrower, the ribs 238 may be virtually invisible to the naked eye of a user of the keypad 100. It should be appreciated that rib thickness narrower than 0.002 inches may be achievable with laser cutting. It should further be appreciated that the ribs 238 of a particular portion of the indicia 240, such as the letter "R," may have the same thickness (e.g., TH1). Alternatively, one or more of the ribs 238 may have different thicknesses. Reducing the thickness of the ribs 238 may cause the ribs 238 to be less visible, for example by a user of a control device in which the button is installed 210. Such ribs 238 may improve the aesthetic characteristics of the indicia 240, and thus of the button 210, for instance when the button 210 is backlit.

By contrast, to achieve rib thicknesses similar to those of the illustrated ribs 238 via machining processes may be undesirably time consuming, and may be accompanied by high failure rates which may in turn reduce manufacturing yield. Additionally, the illustrated ribs 238 may be formed with substantially zero-radius corners 244, while ribs created via machining or via other processes, such as chemical photo etching, electrical discharge machining, or the like, may exhibit rounded corners that are visible to the naked eye and/or that may be aesthetically degraded by one or more heat affected zones.

In accordance with still another characteristic of laser-cut indicia 240, such an alphanumeric character may exhibit variable (e.g., continuously variable) line width. For example, a first section of the illustrated portion of the indicia 240 may exhibit a first line width LW1. A second section of the portion of the indicia 240 may exhibit a second line width LW2 that is narrower than the first line width LW1, and a third section of the portion of the indicia 240 may exhibit a third line width LW3 that is wider than the first line width LW1 and the second line width LW2. Such continuously varying line widths are typically difficult to implement using known machining techniques, for instance requiring multiple machining passes, z-axis translation during machining pass, or the like. The presence of varying line width, such as that exhibited by the "R" of the illustrated indicia 240, may enhance the aesthetic characteristics of the indicia 240, and thus of the button 210, for instance when the button 210 is backlit.

It should be appreciated that respective portions of a laser-cut indicia, such as the example indicia 240, may exhibit one or more of the above-described characteristics, such as all of the above-described characteristics, in any combination.

Figure 4:
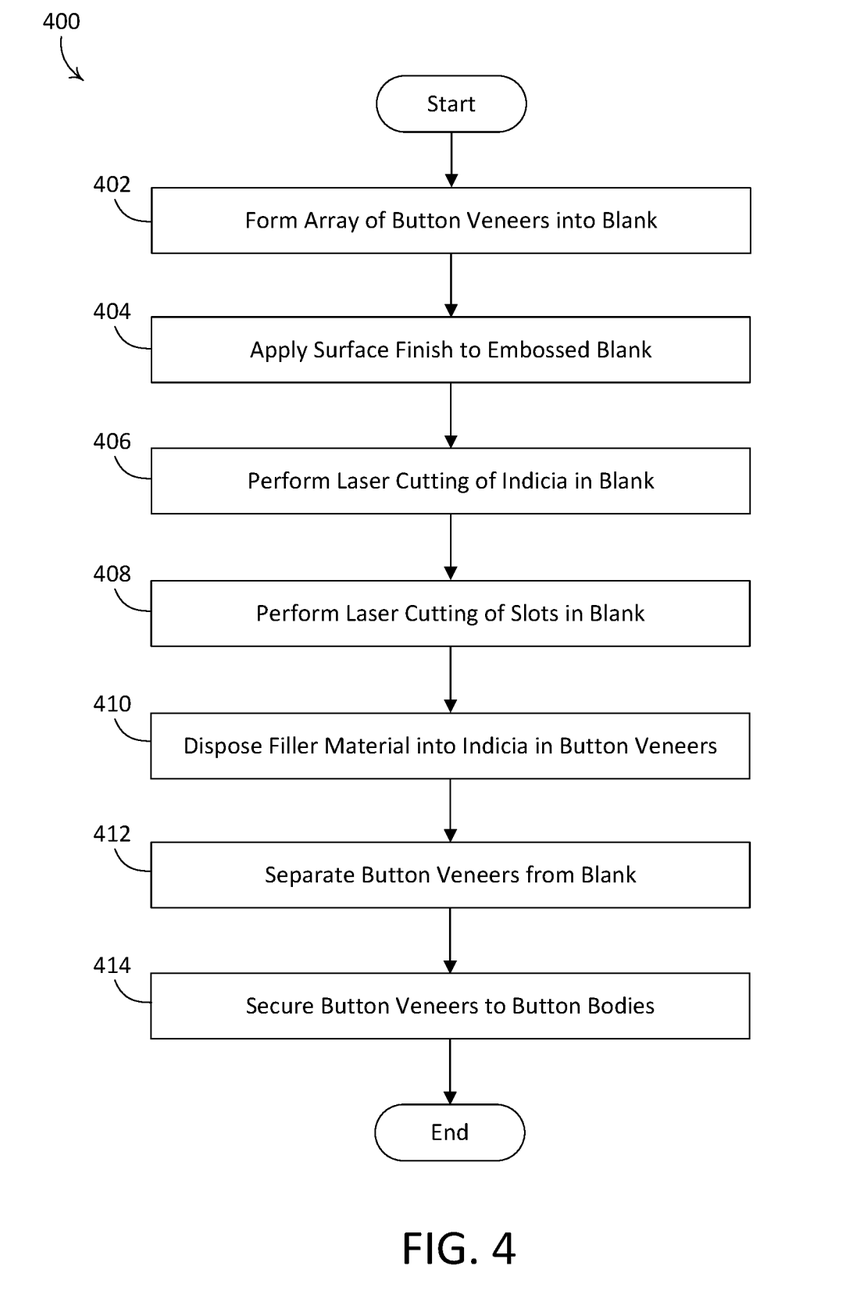
FIG. 4 depicts an example process for producing a button for use in a control device, the button including a veneer having one or more laser-cut indicia.
Figure 5:
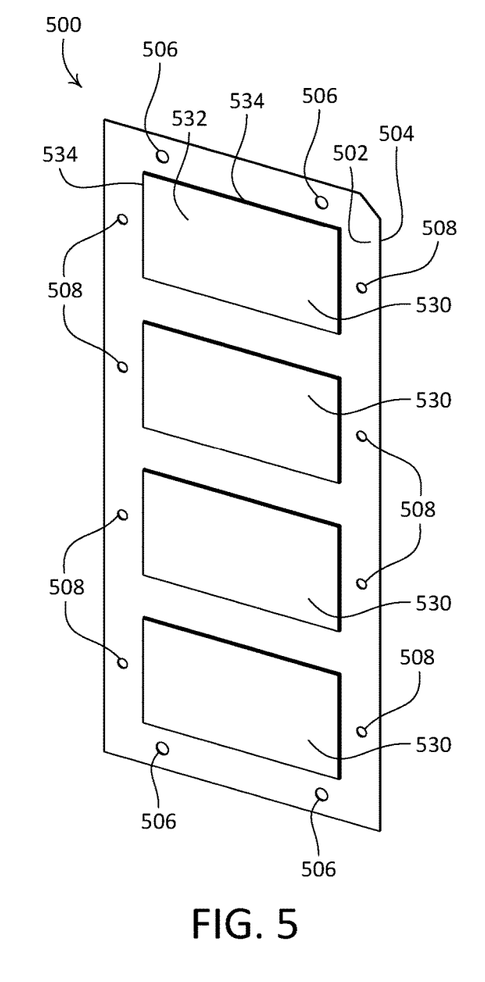
FIG. 5 is a perspective view of a metal blank, stamped to form an array of control device button veneers.

FIG. 4 depicts an example process 400 for producing a button 510 (e.g., as shown in FIGS. 5-7B) for use in a control device. For example, the button 510 may be implemented as one or more of the buttons 110 of the keypad 100. At 402, a formation process may be performed on a blank 500 to define one or more button veneers 530, as shown in FIG. 5. The blank 500 may be, for example, a sheet of metal. As shown, the blank 500 may be a rectangular sheet of stainless steel. The blank 500 may define a planar front surface 502 and an opposed rear surface 504, and may be flat prior to the embossing process. The formation process may be, for example, a sheet metal embossing process, a progressive stamping process, or another process. In accordance with the illustrated process 400, the veneers 530 may be formed by embossing the veneers 530 into the blank 500.

During the embossing process, each of the one or more veneers 530 may be defined by forming a plate portion 532 and peripheral walls 534 that extend around a perimeter of each veneer 530 into the blank 500. The plate portions 532 may define respective front surfaces 533 of the veneers 530. As shown, the plate portion 532 may define respective flat, substantially planar front surfaces 533. The plate portion 532 and the peripheral walls 534 of each veneer 530 may define four corners 531 of the veneer 530. Each veneer 530 may define outer edges 536 that extend along an outer perimeter of the plate portion 532, between the corners 531, along an interface between the plate portion 532 and the peripheral walls 434. As shown, the outer edges 536 of each veneer 530 may be angularly offset relative to the front surface 533. However, it should be appreciated that the veneers 530 are not limited to the illustrated outer edges 536. For example, the veneers 530 may be alternatively formed, with outer edges 536 that may be rounded, may be square, or may define other geometries relative to the front surfaces 533.

As shown, the veneers 530 may be embossed into the rear surface 504 of the blank 500, such that the plate portions 532 of the veneers 530 may be spaced from the front surface 502 of the blank 500. In accordance with the example process 400, the plate portion 532 of each veneer 530 may be spaced from the front surface 502 of the blank by approximately 0.01 inches. The illustrated blank 500 is embossed to define a vertical array of four veneers 530. However, it should be appreciated that more or fewer veneers 530 may be embossed, and that the veneers 530 may be embossed in any alignment relative to each other.

Optionally, during the embossing process, one or more alignment features may be defined in the blank 500. The alignment features may be used to register the blank 500 in position relative to respective machines during one or more portions of the process 400. For example, as shown, the blank 500 may be embossed with a plurality of alignment features that include apertures 506 and 508 that may be spaced from the veneers 530. The apertures 506 and 508 may be configured as optical alignment fiducials, for example. To illustrate, the blank 500 may be positioned within a laser cutting apparatus, via the apertures 506 and 508, prior to performing the laser cutting process.

At 404, a surface finish may be applied to the embossed blank 500. The surface finish may be applied, for example, to one or both of the front surface 502 of the blank 500 and the rear surface 504 of the blank 500. In this regard, one or both of a front surface 533 and a rear surface 535 of each veneer 530 may be treated. The front surface 533 of each veneer 530 may be referred to as an outward-facing surface, and the rear surface 535 of each veneer 530 may be referred to as inward-facing surface.

Figure 6:
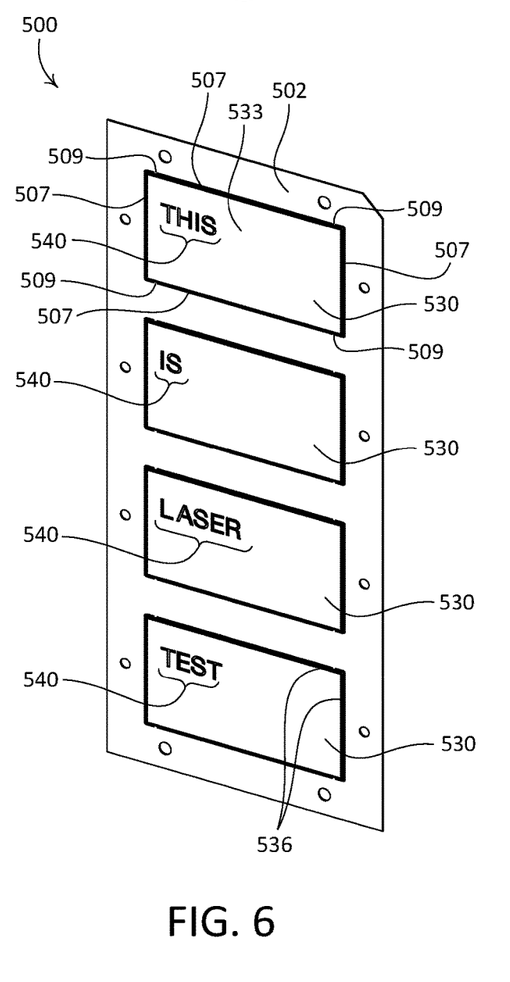
FIG. 6 is a perspective view of the metal blank illustrated in FIG. 5, after a laser cutting process has been performed on the blank.

One or more laser cutting processes may be performed on the blank 500. For example, at 406, a laser cutting apparatus may be configured to perform a first laser cutting process to define indicia 540 in one or more of the veneers 530. As shown, respective indicia 540 may be laser cut through the plate portion 532 of each of the veneers 530. That is, the indicia 540 may be defined into the front surface 533, and through the rear surface 535, of the plate portion 532 of each veneer 530. The illustrated indicia 540 include letters that form words. However, the indicia 540 are not limited to letters, and may include any combination of alphanumeric characters, icons (e.g., symbols), or the like. The indicia 540 may be representative of a command for controlling an electrical load. For example, the indicia 540 may be representative of: a command message that may be transmitted by a control device in which the button 510 is operatively installed; of a command that is executed internally by such a control device; of a result of the performance of a command; or the like.

At 408, during a second laser cutting process, the veneers 530 may be partially cut out from the blank 500. For example, one or more slots 507 may be laser cut through the blank 500 (e.g., into the front surface 502 and through the rear surface 504) along the respective perimeter of each veneer 530. In this regard, respective outer dimensions of the plate portions 532 of the veneers 530 may be defined by the second laser cutting process 408. The laser cutting apparatus may be configured to round the corners 531 of the veneer 530, for example while cutting the slots 507. For example, the corners 531 of the illustrated veneers 530 may be rounded with a radius of approximately 0.005 inches during the laser-cutting process.

To cut the slots 507, the laser cutting apparatus may be configured to adjust the focal point of the laser from a first z-axis position wherein the focal point of the laser is positioned relative to the front surfaces 533 of the veneers 530, to a second, lower z-axis position wherein the focal point of the laser is positioned relative to the front surface 502 of the blank 500. In this regard, the laser apparatus may be configured to adjust the focal point of the laser along a vertical direction relative to the blank 500 during the laser cutting process.

Figure 7:
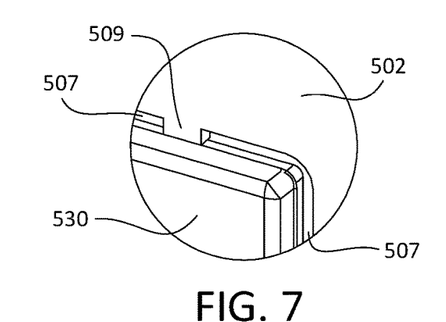
FIG. 7 is a zoomed-in view of a portion of the metal blank illustrated in FIG. 6, illustrating a laser-cut tab that suspends a veneer relative to the blank.

During performance of the second laser cutting process 408, one or more portions of material of the blank 500 within the slots 507 may be left in place, to suspend each veneer 530 relative to the blank 500. For example, as shown, the slots 507 around each veneer 530 may be defined such that four tabs 509 remain that retain the veneer 530 in position relative to the blank 500 (e.g., as shown in FIG. 7). The illustrated tabs 509 are approximately 60 microns wide (relative to opposed sides of the blank 500) and are approximately 20 microns high (relative to opposed upper and lower ends of the blank 500). It should be appreciated, however, that the tabs 509 are not limited to the illustrated arrangement (e.g., number and respective locations of the tabs 509) or the illustrated tab dimensions.

It should be appreciated that the first laser cutting process at 406 and the second laser cutting process at 408 may be performed discretely from each other. Alternatively, the first and second laser cutting processes 406, 408 may be performed as portions of a single laser cutting process (e.g., combining 406 and 408) that is performed on the blank 500. At the conclusion of the laser cutting process and/or processes, the veneers 530 may be suspended relative to the blank 500 via the tabs 509. In this regard, the blank 500, including the veneers 530, may be removed from the laser cutting apparatus as a single piece.

At 410, a filler material (not shown) may be disposed into the indicia 540 of the respective veneers 530. The filler material may at least partially fill the indicia 540. For example, the filler material may fill the indicia 540 such that the filler material defines a filler surface that may be subsurface or convex relative to the front surfaces 533 of veneers 530. In such an example, the filler surface may define one or more fillets along edges of the inner surfaces of the indicia 540, which may reduce the effective depth of the indicia 540. Alternatively, the filler material may fill the indicia 540 such that at least a portion of a filler surface defined by the filler material is substantially flush with (e.g., coplanar with) the front surfaces 533 of veneers 530. The filler material may function to reduce the generation of debris (e.g., dirt, skin, or the like) in the indicia 540, for example by reducing (e.g., eliminating) one or more abrasive edges defined by the indicia 540 that may, for example, scrape material from the finger of a user pressing the button 510 to which the veneer 530 is attached. The filler material may function to prevent the accumulation of such debris in the indicia 540. The filler material may further function to improve the optical performance of the indicia 540 when one or more of the buttons 510 are backlit, for instance to improve the readability of the indicia 540 when viewed from off angle.

The filler material may be any suitable material, such as a laminating film that, upon being heated, may flow and/or be mechanically disposed (e.g., pressed) into the indicia 540 of the veneers 530. In an example, a commercial laminating film may be used. The laminating film may, for example, include a first layer comprising polyester base material and a second layer comprising ethylene-vinyl acetate (EVA) adhesive. It should be appreciated that the constitution (e.g., material and layers) of the laminating film is not limited to the example described herein. Nor is the filler material limited to laminating film. For example, the filler material may comprise any other material that may flow to fill the indicia 540 of the veneers 530 and/or bond to corresponding surfaces of the veneers 530, such as the inner surfaces of the indicia 540 or the rear surfaces 535 of the veneers 530.

A portion of laminating film may be pre-configured to define a filler blank for use in an example process for filling the indicia 540 of one or more veneers 530. For example, a sheet of laminating film may be cut such that a number of tabs are defined that correspond to respective veneers 530. In accordance with an example process for filling the indicia 540 of the veneers 530 of the blank 500 (e.g., as shown in FIG. 6), a portion of laminating film may be cut to define a filler blank that includes a support strip and four tabs that extend outward from the support strip and that are spaced apart from each other along a length of the support strip. In accordance with an example filler blank, each tab may be sized to cover an area of the plate portion 532 of a corresponding one of the veneers 530, for instance where indicia 540 may be defined in the veneer 530.

The filler blank may define one or more alignment features that may allow the filler blank to be properly located during an example indicia filling process. For example, the support strip of the filler blank may define one or more apertures that extend therethrough, the apertures configured to receive complementary alignment features (e.g., posts) of a laminating apparatus, such that the filler blank is properly oriented relative to the blank 500, and such that each tab is properly oriented relative to a corresponding one of the veneers 530. One or more portions of the filler blank, such as the support strip, may be configured (e.g., shaped) to ease removal of one or more remaining portions of the filler blank at the conclusion of an indicia filling process, and such that removal may be achieved without degrading properties of the laminating film, such as adhesion to the indicia 540 and/or veneers 530, or a thickness of the laminating film.

An example process for filling the indicia 540 of one or more veneers 530 using a laminating film filler blank may include the use of one or more portions of adhesive release material. The adhesive release material may be any material that, during heating of the laminating film, may not adhere to and/or modify surfaces of the veneers 530 and/or the blank 500 to which adhesion of the laminating film is not desired. In accordance with an example process for filling the indicia 540 of one or more veneers 530 using a laminating film, the adhesive release material may be paper or another material suitable to prevent the laminating film from bonding to the veneers 530 during an indicia filling process. The adhesive release material may be configured (e.g., cut) to mask areas of the blank 500, such as the veneers 530, to which adhesion of the laminating film is not desired. In an example, the adhesive release material may define a shape that is substantially the same as that of the support strip of the filler blank.

The adhesive release material may define one or more alignment features that may allow the adhesive release material to be properly located during an example indicia filling process. For example, the adhesive release material may define one or more apertures that extend therethrough, the apertures configured to receive complementary alignment features (e.g., posts) of a laminating apparatus. The respective apertures may be defined to align with one or more apertures defined by the filler blank, such that the adhesive release material may be properly oriented relative to the filler blank and the blank 500. The adhesive release material may be configured (e.g., shaped) to ease removal of one or more remaining portions of the filler blank at the conclusion of an indicia filling process. The adhesive release material may be configured to exhibit one or more properties, such as material thickness, that may enable the adhesive release material to promote a consistent finished lamination thickness within the filled indicia 540 of a veneer 530.

A laminating apparatus may be provided in an implementation of an example indicia filling process. An example laminating apparatus may, for example, comprise a laminating press that includes a locating nest and a pressure plate. The laminating apparatus may be configured to apply one or both of heat and pressure to material (e.g., directly or indirectly) that is disposed between the pressure plate and the locating nest, such as the laminating film, at particular times during an example indicia filling process.

The locating nest and pressure plate may be configured to cooperate to apply compression forces to material that is disposed therebetween. For example, the laminating apparatus may be configured such that one or both of the pressure plate and the locating nest move toward each other during an example indicia filling process. For example, the pressure plate and the locating nest may both be configured to move toward one another during an example indicia filling process, or alternatively one of the pressure plate or the locating nest may be fixed relative to the other during the indicia filling process. The laminating apparatus may be configured to evenly distribute compressive force to the laminating film (e.g., via the locating nest and/or via the pressure plate) during an example indicia filling process, for example in accordance with a particular time sequence and/or duration of the process.

The laminating apparatus may be configured to generate and apply heat to material that is disposed between the pressure plate and the locating nest. For example, one or both of the locating nest and the pressure plate may be configured to generate and evenly distribute heat to the laminating film throughout a controlled range of temperatures during an indicia filling process. In an example, the laminating apparatus may generate heat across a controlled range of temperatures in accordance with a particular time sequence and/or duration of the process. The laminating apparatus may be configured to transfer heat to the laminating film (e.g., directly or indirectly) from the locating nest, from the pressure plate, or from a combination of the locating next and the pressure plate. The laminating apparatus may be configured to generate repeatable temperature and/or heat distribution over consecutive cycles of an example indicia filling process.

In accordance with an example implementation of a laminating apparatus, the locating nest may include a substantially plate-shaped body that defines a rectangular outer perimeter and an upward-facing inner surface. The body may define a recess that extends into the inner surface. The locating nest may include a resiliently deformable pad that is configured to be received in the recess. The pad may be sized such that when a blank 500 is positioned on the pad during an example indicia filling process, the outer perimeter of the blank 500 does not extend beyond corresponding sides of the pad. For example, the pad may define a rectangular shape, and may be elongate between first and second ends such that the pad defines a length that is longer than a height of the blank 500, and may define first and second sides that are spaced apart from each other by a distance that is substantially equal to a width of the blank 500.

The pad may be configured to promote conformance of the laminating film into the respective indicia 540 of one or more veneers 530 during an indicia filling process. For example, during an example indicia filling process, the filler blank may be compressed between a blank 500 and the pad. The pad may deform resiliently under compressive forces generated by the laminating apparatus, such that corresponding portions of the pad bias the tabs of the filler blank into corresponding veneers 530 of the blank 500, which may cause the laminating film to flow into the indicia 540 of the veneers 530. The locating nest may be configured to generate and/or transfer heat at one or more locations along the inner surface.

The locating nest may define one or more alignment features that may allow the filler blank, the adhesive release layer, and/or the blank 500 to be properly located during an example indicia filling process. For example, the locating nest may define one or more posts that extend upward from the inner surface of the body along a direction that is perpendicular to the inner surface. Each post may be configured to receive one or more of a corresponding aperture in the support strip of the filler blank, a corresponding aperture in the adhesive release layer, or an aperture 506 or

508 of a blank 500. The posts may be configured to facilitate proper orientation and alignment of the filler blank, the adhesive release layer, and a blank 500 relative to each other, and relative to the pad, during an indicia filling process.

The locating nest may define a groove that extends into the body along a portion of the outer perimeter of the body. The groove may be configured to facilitate removal of the filler blank, the adhesive release layer, and a blank 500 at the conclusion of an indicia filling process. The filler blank, the adhesive release layer, and the blank 500 may be referred to as a laminating assembly, for instance when disposed in the laminating apparatus. The groove may be configured such that a portion of the filler blank and/or adhesive release layer extends into the groove when the laminating assembly is properly oriented in the locating nest. In an example, the groove may be sized to accommodate a finger and/or thumb of an individual.

In accordance with an example implementation of a laminating apparatus, the pressure plate may include a substantially plate-shaped body that defines a downward-facing inner surface. The body of the pressure plate may define a rectangular outer perimeter that is substantially the same as that of the locating nest. Stated differently, the inner surface of the pressure plate may define an area that is substantially the same as an area defined by the inner surface of the locating nest. The pressure plate may define one or more openings that extend into the inner surface. The openings may be configured to receive respective ones of the posts of the locating nest as the pressure plate and the locating nest move toward each other during an indicia filling process. The pressure plate may be configured to generate and/or transfer heat at one or more locations along the inner surface.

One or both of the locating nest and the pressure plate may be configured such that laminating film of the filler blank that comes into contact with respective surfaces of the locating nest and/or the pressure plate during an indicia filling process will not adhere to and/or accumulate on those surfaces. One or both of the locating nest and the pressure plate may be configured such that portions of the blank 500 (e.g., the veneers 530) that come into contact with respective surfaces of the locating nest and/or the pressure plate during an indicia filling process will not adhere to those surfaces. It should be appreciated that the laminating apparatus is not limited to the laminating press as described herein. For example, an alternative implementation of an indicia filling process may utilize a locating "sandwich" and a heated roller laminator.

In an example indicia filling process using laminating film, the laminating apparatus may be prepared before the process is initiated. For example, preparation of the laminating apparatus may include placing a first release film on the pad in the locating nest and a second release film on the inner surface of the pressure plate. The first release film may be dimensioned such that an outer perimeter of the first release film conforms to an outer perimeter of the pad, or may be otherwise dimensioned. The second release film may be dimensioned such that an outer perimeter of the second release film conforms to an outer perimeter of the inner surface of the pressure plate, or may be otherwise dimensioned.

In a first step of the example indicia process, the filler blank, the adhesive release layer, and the blank 500 may be positioned on the locating nest, so as to define a laminating assembly. The filler blank, the adhesive release layer, and the blank 500 may be disposed onto the locating nest such that one or more posts of the locating nest are received in corresponding apertures of the filler blank, the adhesive release layer, and the blank 500, which may ensure proper orientation of the filler blank, the adhesive release layer, and the blank 500 relative to each other. The filler blank may be disposed onto the locating nest such that the polyester side faces the inner surface of the locating nest, and rests against the first release film and the pad, with the EVA side facing upward toward the inner surface of the pressure plate. In this regard, the polyester side of the filler blank may be referred to as a back side relative to the veneers 530, and the EVA side of the filler blank may be referred to as a front side relative to the veneers 530. The adhesive release layer may be placed on the filler blank, such that it rests on the EVA side of the filler blank. The blank 500 may then be disposed onto the adhesive release layer and filler blank, with the rear surface 504 of the blank 500 facing the inner surface of the locating nest and the front surface 502 of the blank facing the inner surface of the pressure plate. It should be appreciated that the orientation of the laminating assembly relative to the laminating apparatus is not limited to the example orientation described herein. For instance, the laminating assembly may be alternatively oriented in the laminating apparatus, such as in an inverted or rotated orientation relative to the orientation described herein.

In a second step of the example indicia filling process, with the laminating assembly positioned on the locating nest, a heat and pressure cycle of the laminating apparatus may be initiated. The heat and pressure cycle may be performed for a predetermined amount of time. In accordance with an example heat and pressure cycle, the pressure plate may be configured to apply a controlled sequence of pressure and heat to the laminating assembly. As heat and pressure are applied to the filler blank, the adhesive release layer, and the blank 500, the laminating film of the filler blank may flow into the respective indicia 540 of the veneers 530. The laminating film may bond with one or more surfaces of the veneers 530. For example, the laminating film may adhere to the inner surfaces of the indicia 540 and/or to the rear surfaces 535 of the veneers 530. The pressure plate may be configured to, at the end of the controlled sequence, back off and/or remove heat and pressure from the laminating assembly such that the bond between the laminating film and the veneers 530 is maintained. It should be appreciated that the example indicia filling process is not limited to the heat and pressure cycle as described herein. For instance, the laminating apparatus may alternatively be configured such that heat may be applied to the laminating assembly by the pressure plate but not by the locating nest, or may be applied to the laminating assembly by both the pressure plate and the locating nest.

In a third step of the example indicia filling process, the finished laminating assembly may be removed from the laminating apparatus. The finished laminating assembly may be cooled, for instance actively and/or passively, to allow the laminating film to cure before the laminating assembly is removed from the laminating apparatus. The finished laminating assembly may be actively cooled, for example, during a timed cooling cycle performed using a solenoid-controlled air jet. Alternatively, the finished laminating assembly may be allowed to passively cool for a period of time before removal from the laminating apparatus. In an example of removing the laminating assembly, an individual may insert a finger and thumb into the groove, may pinch exposed portions of the filler blank and/or the adhesive release layer, and may remove the finished laminating assembly from the laminating apparatus, for example by lifting the finished laminating assembly away from the inner surface of the locating nest.

In a fourth step, with the finished laminating assembly removed from the laminating apparatus, excess laminating film and/or adhesive release material may be removed from the finished laminating assembly. For example, excess laminating film and/or adhesive release material may be pulled from the veneers 530. The excess material may be removed while the veneers 530 are attached to the blank 500 or after the veneers 530 have been detached from the blank 500.

In another example implementation, the filler material may backfilled into the indicia 540 without the application of heat. The filler material may be any suitable material, such as ultraviolet (UV) curable acrylic adhesive. In accordance with an example of backfilling the indicia 540, the blank 500 may be placed, front surface 502 facing downward, on a flat surface. The filler material may then be disposed into the indicia 540 along the rear surfaces 535 of the veneers 530. For example, the acrylic adhesive may be mechanically disposed (e.g., pressed) into the indicia 540.

The filler material may at least partially fill the indicia 540. For example, the filler material may fill the indicia 540 such that the filler material defines a filler surface that may be subsurface or convex relative to the front surfaces 533 of veneers 530. In such an example, the filler surface may define one or more fillets along edges of the inner surfaces of the indicia 540, which may reduce the effective depth of the indicia 540. Alternatively, the filler material may fill the indicia 540 such that at least a portion of a filler surface defined by the filler material is substantially flush with (e.g., coplanar with) the front surfaces 533 of veneers 530.

Once disposed into the indicia 540, the acrylic adhesive may be cured, which may cause the acrylic adhesive to bond to the veneers 530, for instance to inner surfaces of the indicia 540 and/or to the rear surfaces 535 of the veneers 530. Optionally, the rear surface 535 of each veneer 530 may be wiped, for instance to remove excess filler material. It should be appreciated that disposing the filler material into the indicia 540 is not limited to a backfilling process as described herein, and that the filler material may otherwise be disposed into the indicia 540. For example, the filler material may alternatively be disposed into the indicia 540 along the front surfaces 533 of the veneers 530. Such a front surface 533 application may be performed without wiping filler material from the veneers 530.

Returning now to the example process 400, at 412, the veneers 530 may be separated from the blank 500. For example, each veneer 530 may be freed by causing the tabs 509 to break, thereby releasing the veneer 530 from the blank 500. It should be appreciated that any portions of the tabs 509 that remain attached to the veneers 530 after separation of the veneers 530 from the blank 500 may be too small to see with the naked eye or to feel, such that a secondary cleaning process may not be performed on the veneers 530 after separation from the blank 500.

Figure 8A:
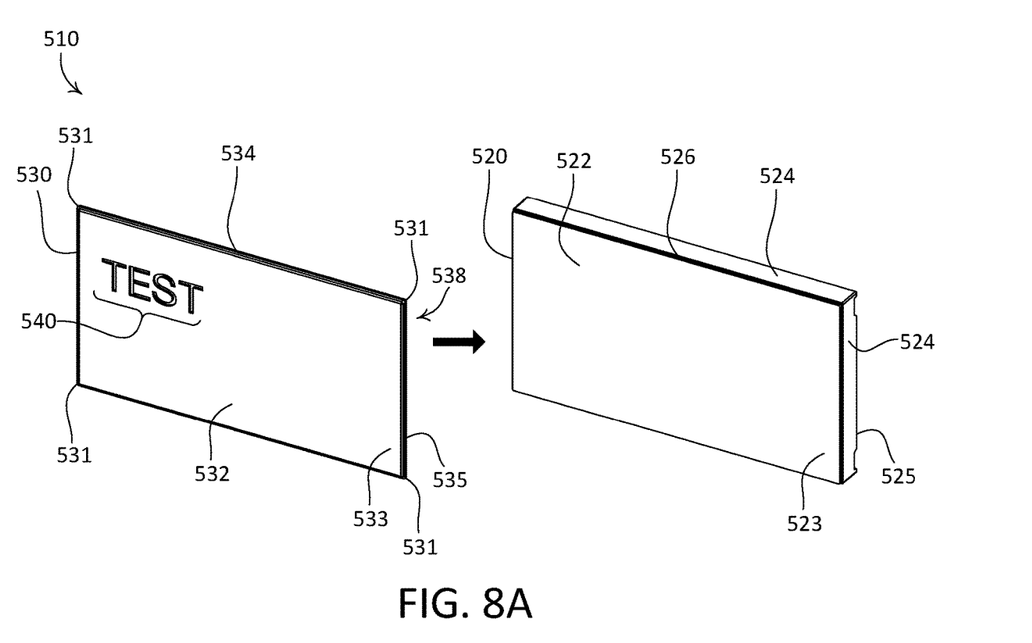
FIG. 8A depicts the button of a control device, and a laser-cut button veneer, before the veneer is secured to the button.
Figure 8B:
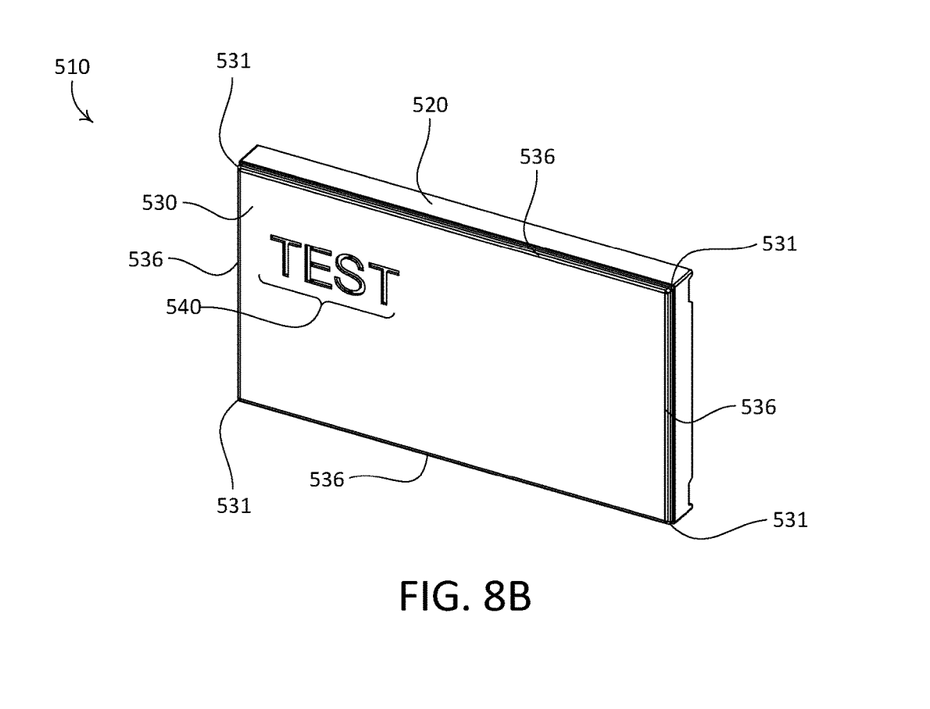
FIG. 8B depicts the button illustrated in FIG. 8A, with the veneer secured to the button.

At 414, assembly of the buttons 510 may be completed by securing each veneer 530 to a corresponding button body 520 (e.g., as shown in FIGS. 8A-8B). The button body 520 of each button 510 may be referred to as a carrier portion, such as a carrier portion of the button 510 or more generally as a carrier portion of a control device in which the button 510 is installed, such as the keypad 100. Each button body 520 may have a front wall 522 that defines a front surface 523 and an opposed rear surface 525 of the of the button body 520. The front wall 522 of each button body 520 may be referred to as an outer surface of the button 510. Each button body 520 may further include perimeter walls 524 that extend rearward from the front wall 522. The perimeter walls 524 may define an outer perimeter that is slightly longer than that of the front wall 522, such that each button body 520 defines a shallow shelf 526 that extends around the perimeter of the front wall 522, such that the front wall 522 defines a projection relative to the perimeter walls 524.

The plate portion 532 and peripheral walls 534 of each veneer 530 may define a cavity 538 that extends into a rear of the veneer 530. The front wall 522 of each button body 520 may be configured to be received in the cavity 538 of a corresponding one of the veneers 530, for instance such that the peripheral walls 534 of the veneer 530 extend to the perimeter walls 524 of the button body 520. In this regard, each button body 520 may be configured such that the plate portion 532 and the peripheral walls 534 of a corresponding veneer 530 at least partially enclose the front wall 522 of the button body 520 when the veneer 530 is attached to the button body 520. When each veneer 530 is secured in place relative to a corresponding button body 520, the rear surface 535 of the plate portion 532 may abut the front surface 523 of the button body 520. The veneers 530 may be secured to corresponding button bodies 520 using an adhesive, for example. It should be appreciated that the veneers 530 may be otherwise secured to the corresponding button bodies 520, for example via mechanical attachment, such as tabs, snap locks, fasteners, or the like.

The button bodies 520 may be made of a translucent material, for instance white or clear plastic, such that when the button bodies 520 are backlit, light may pass through the button bodies 520 and reach the rear surfaces 535 of the plate portions 532 of the veneers 530. Such light may be emitted, for example, from the interior of a control device in which the buttons 510 are installed. In accordance with such an implementation, the indicia 540 of the veneers 530 may expose corresponding underlying surfaces of the button bodies 520, such that the indicia 540 may be illuminated when the button bodies 520 are backlit. In this regard, the veneers 530 may be configured to be secured to the backlit buttons of a control device.

It should be appreciated that the example process 400 is not limited to the illustrated operations 402-414. For example, one or more operations of the example process 400 may be omitted. To illustrate, in an alternative example process the formation of the blank 500, at 402, may be omitted. However, the remaining portions of the process 400 may be performed on the unformed blank 500. It should further be appreciated that the example process 400 is not limited to the illustrated order of performing the operations. For example, the veneers 530 may be separated from the blank 500 before the filler material is disposed into the indicia 540, such that 412 may alternatively be performed before 410.

It should be appreciated that the example processes and manufacturing techniques illustrated and described herein are not limited to the production of laser-cut veneers for application to the buttons of backlit keypads, and that those example processes and manufacturing techniques may be otherwise applied, for instance to laser cutting other components of a control device.

Figure 9:
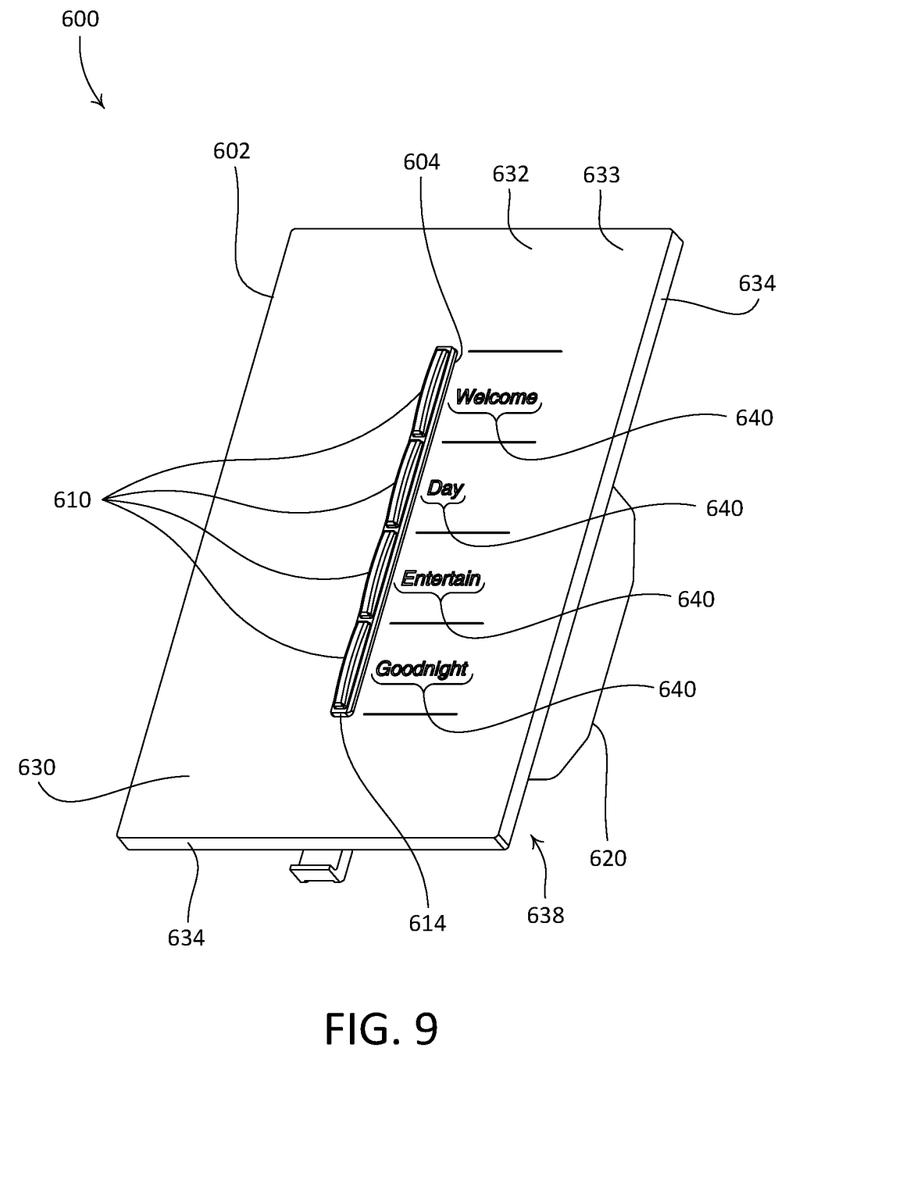
FIG. 9 is a perspective view of another example control device, configured as a wall-mounted keypad, for use in a load control system for controlling the amount of power delivered to one or more electrical loads.

For example, FIG. 9 depicts an example control device that may be configured to operate in a load control system for controlling one or more load control devices and/or electrical loads, such as lighting loads, motorized window treatments, or the like. As shown, the example load control device is configured as a wall-mounted keypad 600. The keypad 600 may include a faceplate 602, one or more buttons 610, and a housing 620 that is configured to be mounted to a structure, such as within a wallbox that is installed in an interior wall of a building. The faceplate 602 may define an opening 604 that extends therethrough and that is configured to at least partially receive the buttons 610 and a bezel 614 that carries the buttons 610. The illustrated keypad 600 may be configured to control a load control device, such as a load control device configured to control an amount of power delivered to one or more electrical loads (e.g., one or more lighting loads) from a power source, such as an alternating-current (AC) power source or a direct current (DC) power source.

The faceplate 602 may include a faceplate body (not shown) and a veneer 630 that is attached to a front surface of the faceplate body. The faceplate body may be referred to as a carrier portion, such as a carrier portion of the faceplate 602 or more generally as a carrier portion of the keypad 600. The veneer 630 of the faceplate 602 may include a plate portion 632 and peripheral walls 634 that extend around a perimeter of the veneer 630. The plate portion 632 may define a front surface 633 of the veneer 630, and more generally a front surface of the faceplate 602. As shown, the plate portion 632 may define a flat, substantially planar front surface 633. The veneer 630 may be made of any suitable material, such as metal. The veneer 630 may be made of sheet metal, for example, and the plate portion 632 and the peripheral walls 634 may be defined, for example by an embossing process, a progressive stamping process, or the like.

The plate portion 632 and peripheral walls 634 of the veneer 630 may define a cavity 638 that extends into a rear of the veneer 630. The faceplate body may be configured to be received in the cavity 638 of the veneers 630. The veneer 630 may be secured to the faceplate body using an adhesive, for example. It should be appreciated that the veneer 630 may be otherwise secured to the faceplate body, for example via mechanical attachment, such as tabs, snap locks, fasteners, or the like.

The veneer 630 may include one or more indicia, such as indicia 640 that are defined in the plate portion 632 of the veneer 630. In accordance with the faceplate 602 of the illustrated keypad 600, the indicia 640 may be words that are indicative of respective functions that may be performed by the keypad 600, and that may be invoked by depressing the buttons 610. The indicia 640 may be laser cut through the veneer 630. For example, the indicia 640 may be formed during a laser cutting process. Forming the indicia 640 of the veneer 630 via a laser cutting process may enable the indicia 640 to exhibit one or more characteristics that are not typically achievable in indicia defined via known processes of button veneer manufacture, such as machining. Examples of such characteristics are illustrated in FIGS. 2 and 3 and described herein.

The keypad 600 may include one or more lighting elements (not shown) that are configured to illuminate the indicia 640 from within the interior of the keypad 600, such that the indicia 640 are backlit. For example, the keypad 600 may include a plurality of lighting elements, such as light emitting diodes (LEDs), that are disposed within the housing 620 of the keypad 600, behind the faceplate 602, and that are configured to backlight the faceplate 602. In this regard, the illustrated keypad 600 may be referred to as a backlit keypad or control device.

As shown, the indicia 640 extend into the front surface 633 of the veneer 630 and through the plate portion 632. The front surface 633 of the veneer 230 may alternatively be referred to as an outer surface of the veneer 630, and more generally as an outer surface of the faceplate 602. The faceplate body may be made of a translucent material, for instance white or clear plastic, such that when the faceplate body is backlit, light may pass through the faceplate body and reach an inner surface of the veneer 630, for example an inner surface of the plate portion 632. Such light may be emitted, for example, from the interior of the keypad 600. In accordance with such an implementation, the indicia 640 of the veneer 630 may expose corresponding underlying surfaces of the faceplate body, such that the indicia 640 may be illuminated when the faceplate body is backlit. In this regard, the veneer 630 may be configured to be secured to a backlit faceplate of a control device.

The illustrated indicia 640 include letters that form respective words. However, the indicia 640 are not limited to letters, and may include any combination of alphanumeric characters, icons (e.g., symbols), or the like. The indicia 640 may be representative of a command for controlling an electrical load. For example, the indicia 640 may be representative of: a command message that may be transmitted by the keypad 600; of a command that is executed internally by the keypad 600; of a result of the performance of a command; or the like. To illustrate, the indicia 640 may be representative of predetermined scenes that correspond to respective lighting intensities of one or more lighting loads that are controlled by the keypad 600. One or more command messages to invoke a corresponding scene may be transmitted by the keypad 600 in response to one or more actuations of the buttons 610, for example.

The veneer 630 may include a filler material (not shown) that is disposed into the indicia 640. The filler material may, for example, be backfilled into the indicia 640 such that the filler material is coplanar with the front surface 633 of the veneer 630. The filler material may, for example, function to improve the optical performance of the indicia 640 when one or more of the buttons 610 are backlit, for instance to improve the readability of the indicia 640 when viewed from off angle.

The invention claimed is:

1. A control device comprising a button with a metal veneer that is configured to be secured to a backlit portion of the control device, the control device comprising:
   a translucent carrier portion configured to be backlit by one or more light emitting diodes;
   a metal plate portion having a front surface to be depressed to actuate the button, and a rear surface opposite the front surface, the metal plate portion including one or more indicia defined through the front surface and the rear surface by a laser cutting process, wherein the metal plate portion is configured to be secured to the translucent carrier portion; and
   a filler material that is disposed in the one or more indicia of the metal plate portion, wherein the filler material forms a filler surface within the one or more indicia thereby reducing an effective depth of the one or more indicia, wherein the filler surface is at least one of subsurface or convex to the front surface of the metal plate portion.

2. The control device of claim 1, wherein the filler material is configured to flow to fill the one or more indicia and to bond to inner surfaces of the one or more indicia.

3. The control device of claim 1, wherein the filler material comprises a laminating film that is heated and pressed into the one or more indicia.

4. The control device of claim 3, wherein the laminating film is applied to an inward-facing surface of the metal plate portion.

5. The control device of claim 4, wherein the laminating film adheres to one or more inner surfaces of the one or more indicia.

6. The control device of claim 4, wherein the laminating film adheres to the inward-facing surface of the metal plate portion.

7. The control device of claim 1, wherein the filler material comprises a curable acrylic adhesive that is pressed into the one or more indicia.

8. The control device of claim 7, wherein the curable acrylic adhesive is applied to an inward-facing surface of the metal plate portion.

9. The control device of claim 1, wherein the filler material is configured to improve readability of the one or more indicia when viewed from off angle by a user.

10. The control device of claim 1, wherein the translucent carrier portion is made of white or clear plastic.

11. The control device of claim 10, wherein the translucent carrier portion comprises a button body.

12. The control device of claim 10, wherein the translucent carrier portion comprises a faceplate body.

13. The control device of claim 1, wherein a surface of the translucent carrier portion is exposed through the one or more indicia of the metal veneer when the metal veneer is secured to the translucent carrier portion.

14. A control device comprising a button with a metal veneer that is configured to be secured to a backlit portion of the control device, the control device comprising:
   a translucent carrier portion configured to be backlit by one or more light emitting diodes;
   a metal plate portion having a front surface to be depressed to actuate the button, and a rear surface opposite the front surface, the metal plate portion including one or more indicia defined through the front surface and the rear surface by a laser cutting process, wherein the metal plate portion is configured to be secured to the translucent carrier portion, and wherein the metal plate portion defines a rib that suspends a floating portion of the one or more indicia relative to an open portion of the one or more indicia, wherein the rib defines a thickness between 0.002 inches and 0.004 inches; and
   a filler material that is disposed in the one or more indicia of the metal plate portion, wherein the filler material forms a filler surface within the one or more indicia thereby reducing an effective depth of the one or more indicia.

15. The control device of claim 14, wherein the rib defines a thickness that does not exceed 0.003 inches.

16. A control device comprising a button with a metal veneer that is configured to be secured to a backlit portion of the control device, the control device comprising:
   a translucent carrier portion configured to be backlit by one or more light emitting diodes;
   a metal plate portion secured to the translucent carrier portion, the metal plate portion including one or more indicia extending through the metal plate portion, thereby exposing the translucent carrier portion; and
   a filler material that is disposed in the one or more indicia of the metal plate portion such that a surface of the filler material is at least one of subsurface or convex to a front surface of the metal plate portion.

17. The control device of claim 16, wherein the filler material is configured to flow to fill the indicia and to bond to inner surfaces of the one or more indicia.

18. The control device of claim 16, wherein the filler material comprises a curable acrylic adhesive that is pressed into the one or more indicia.

19. The control device of claim 16, wherein the filler material comprises a laminating film that is heated and pressed into the one or more indicia.

20. The control device of claim 16, wherein the filler material is applied to a back surface of the metal plate portion.

* * * * *